United States Patent
Pommerening et al.

(10) Patent No.: US 10,417,610 B2
(45) Date of Patent: Sep. 17, 2019

(54) SYSTEM AND METHOD FOR VERIFYING A LOAD PLACED IN ONE OR MORE TRUCKS

(71) Applicants: Brent Robert Pommerening, Shorewood, IL (US); Patrick Alan Dunbar, Downers Grove, IL (US)

(72) Inventors: Brent Robert Pommerening, Shorewood, IL (US); Patrick Alan Dunbar, Downers Grove, IL (US)

( * ) Notice: Subject to any disclaimer, the term of this patent is extended or adjusted under 35 U.S.C. 154(b) by 289 days.

(21) Appl. No.: 15/265,845

(22) Filed: Sep. 14, 2016

(65) Prior Publication Data

US 2017/0076250 A1 Mar. 16, 2017

Related U.S. Application Data

(60) Provisional application No. 62/218,170, filed on Sep. 14, 2015.

(51) Int. Cl.
| | | |
|---|---|---|
| *G06Q 10/08* | (2012.01) | |
| *G06K 7/14* | (2006.01) | |
| *G06K 7/10* | (2006.01) | |

(52) U.S. Cl.
CPC ....... *G06Q 10/087* (2013.01); *G06K 7/10366* (2013.01); *G06K 7/1413* (2013.01); *G06K 7/1417* (2013.01)

(58) Field of Classification Search
CPC ............. G06Q 10/087; G06K 7/10366; G06K 7/1417; G06K 7/1413
See application file for complete search history.

(56) References Cited

U.S. PATENT DOCUMENTS

| 4,605,081 | A | * | 8/1986 | Helmly, Jr. ............ | G01G 19/02 |
| | | | | | 177/1 |
| 5,822,224 | A | * | 10/1998 | Nakanishi .............. | G01G 19/12 |
| | | | | | 702/174 |
| 5,848,368 | A | * | 12/1998 | Allen ..................... | G07C 5/008 |
| | | | | | 701/50 |
| 8,626,541 | B2 | * | 1/2014 | Doan ..................... | G06Q 10/00 |
| | | | | | 705/7.11 |
| 2007/0007080 | A1 | * | 1/2007 | Manthey ............... | B66F 9/0755 |
| | | | | | 187/224 |
| 2008/0011839 | A1 | * | 1/2008 | Noll ....................... | G06Q 10/08 |
| | | | | | 235/384 |
| 2008/0028988 | A1 | * | 2/2008 | Welker ................ | B01F 3/04446 |
| | | | | | 106/316 |

(Continued)

OTHER PUBLICATIONS

"Cement Manufacturer Plans RFID Rollout to All 16 Plants". Author: Bob Violino. RFID Journal. Oct. 2013. (Year: 2013).*

(Continued)

*Primary Examiner* — Nathan A Mitchell
(74) *Attorney, Agent, or Firm* — Richard A. Fagin (57) ABSTRACT

A system for verifying a load placed in one or more trucks that include a plant, a mixer, a discharge point, the one or more trucks, an output ID, an output ID reader and a material load verification non-transitory storage media. The system may also include a third-party cloud platform or an output ID reader that display data from the output ID reader that may be read, relayed and utilized for a configuration decision that would be made by a plant manager on comparing a truck file database with the load matrix interface.

10 Claims, 4 Drawing Sheets

(56) References Cited

U.S. PATENT DOCUMENTS

| | | | | |
|---|---|---|---|---|
| 2008/0273415 | A1* | 11/2008 | Thornton | B28C 5/468 366/3 |
| 2010/0023170 | A1* | 1/2010 | Sherwood | G05B 9/02 700/282 |
| 2013/0297929 | A1* | 11/2013 | Chaves | H04L 9/0844 713/150 |
| 2017/0335525 | A1* | 11/2017 | Chambers | E01C 23/01 |
| 2018/0010954 | A1* | 1/2018 | Lowndes | G01G 19/12 |

OTHER PUBLICATIONS

"Cimko Cement Plant Loads Up on RFID". Author: Brett Neely. RFID Journal. Jun. 2009. (Year: 2009).*

"Global cement manufacturing company deploys a RFID-enabled Truck Movement Optimization System". Essen Rfid. Retrieved from <http://www.essenrfid.com/Mailer/Holcim_Vehicle_Optimisation.pdf> Jan. 2019. (Year: 2019).*

"Expeditious Cement Loading through RFID Technology". Siemens. 2010. (Year: 2010).*

* cited by examiner

SYSTEM AND METHOD FOR VERIFYING A LOAD PLACED IN ONE OR MORE TRUCKS

The present application claims the benefit of U.S. Provisional Patent Application 62/218,170 filed on 14 Sep. 2015, the entire disclosure of which is incorporated by reference.

FIELD OF THE INVENTION

The present invention generally relates to a system and method for verifying a load. More specifically, the present invention relates to a system and method for verifying a load prior to any batch constituents being discharged into one or more trucks.

DESCRIPTION OF THE RELATED ART

In the current art of loading a truck at a discharge point of a ready mix cement plant or an asphalt plant, there is no existing system and process to verify that the correct truck is actually at the discharge point prior to receiving its intended batch. Without a defined verification process prior to physically loading a particular batch on a particular truck, these industries are exposed to a high level of liability, as at any given time, since an incorrect truck may stage under the discharge point of the plant mistakenly, subsequently receiving the incorrect batch that was intended for another truck.

Today's batching technology is growing in complexity through efficiency. Batch technology allows for loads to be processed very quickly and some loading sites even have multiple loading areas and discharge points. Each batch is unique and each batch may have very different constituents and quantities. Therefore it is imperative that when a truck is called into a loading sequence by a dispatcher, a plant operator or a similar process for a particular load at a discharge point, that the correct truck actually gets loaded with its intended load. There are operations utilized to sequence trucks involved with loading at a discharge point as well as many human factors which may lead to uncertainties, errors, confusion and possible risk of delivering the incorrect batch to a jobsite.

BRIEF SUMMARY OF THE PRESENT INVENTION

The present invention generally relates to a system and method for verifying a load. More specifically, the present invention relates to a system and method for verifying a load prior to any batch constituents being discharged into one or more trucks.

Major plant operations related to these fields include weighing, metering and discharging of various raw materials and other constituents of varying proportions commonly known as mixes, in volumetric intervals onto specialized trucks for eventual delivery to an end user. A particular mix when weighed by targeted volume is commonly known as a batch or a load. Each truck receives its own batch or load and no individual batch or load may be shared between any trucks.

The present invention is a system for verifying a load prior to any batch constituents being discharged into trucks that includes a plant having a fleet area and a loading area, one or more trucks, a discharge point, a output ID reader included in each of the one or more trucks, an output identifier, one or more output ID readers, a server system having one or more databases, a material load verification non-transitory storage media that resides on the one or more databases and a load matrix interface.

It is an object of the present invention to provide a system and method for verifying that a load to be discharged into a truck at a plant includes verification and assurance that the correct truck will be loaded with the correct batch at the discharge point of a plant before, during or after the discharge sequence being initiated but prior to any batch constituents being discharged into the trucks on an ongoing load to load basis.

It is also an object of the present invention to provide a system and method for verifying that a load to be discharged into a truck at a plant includes a computer readable truck output ID, a non-transitory storage media and one or more computer databases to provide verification and assurance that the correct truck is being loaded with the correct batch at the discharge point of a plant before, during or after the discharge sequence is being initiated but prior to any batch constituents being discharged into the truck on an ongoing load to load basis.

It is also an object of the present invention to provide a system and method for verifying that a load to be discharged into a truck at a plant that includes a computer readable truck output ID, a non-transitory storage media, one or more computer databases and controlled flow of the one or more trucks in the areas of a plant to provide verification and assurance that the correct truck is being loaded with the correct load at the discharge point of a plant before, during or after the discharge sequence is being initiated but prior to any batch constituents being discharged into the material mixing truck, on an ongoing load to load basis.

It is also an object of the present invention to provide a system and method for controlling a plant batching control functionality in order to initiate, continue or hold a discharge sequence depending on a test result. If an incorrect truck is flagged at the discharge point when the test is made, the discharge sequence will not initiate or will be stopped prior to any batch constituents being loaded into a truck. If the correct truck is at the discharge point when the test is made, the discharge sequence may be initiated or continued.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION OF ILLUSTRATIVE EMBODIMENTS

Various aspects of the illustrative embodiments will be described utilizing terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations are set forth in order to provide a thorough understanding of the illustrative embodiments. However, it will be apparent to one skilled in the art that the present invention may be practiced without the specific details. In other instances, well-known features are omitted or simplified in order not to obscure the illustrative embodiments.

Various operations will be described as multiple discrete operations, in turn in a manner that is most helpful in understanding the present invention. However, the order of description should not be construed as to imply that these operations are necessarily order dependent. In particular, these operations need not be performed in the order of presentation.

The phrase "in one embodiment" is used repeatedly. The phrase generally does not refer to the same embodiment, however, it may. The terms "comprising", "having" and "including" are synonymous, unless the context dictates otherwise.

Figure 1:
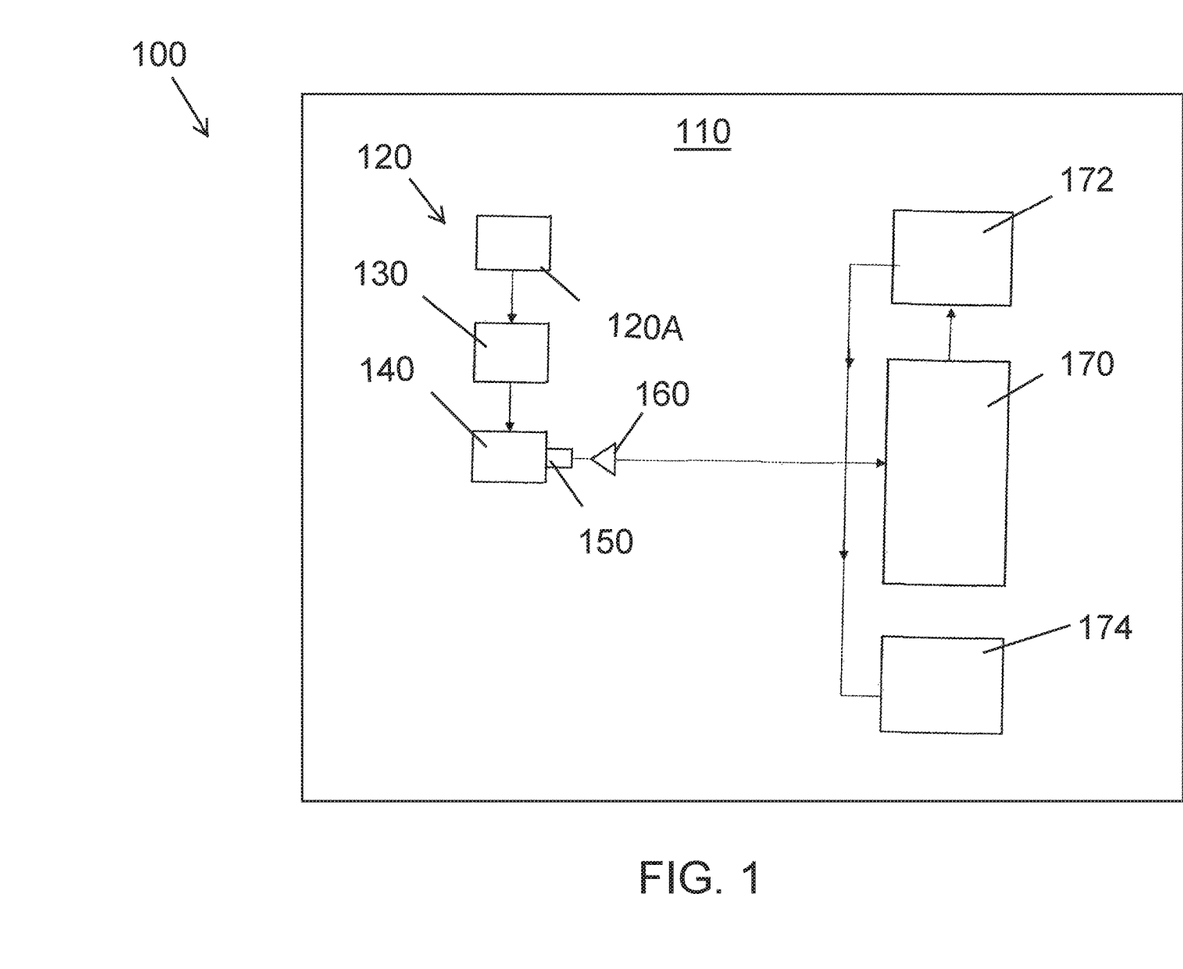
FIG. 1 illustrates a first system for verifying a load placed in one or more trucks, in accordance with one embodiment of the present invention.

FIG. 1 illustrates a first system 100 for verifying a load placed in one or more trucks 140, in accordance with one embodiment of the present invention.

The first system 100 may include a plant 110, a mixer 120, a discharge point 130, the one or more trucks 140, an output ID 150, an output ID reader 160 and a material load verification non-transitory storage media 170.

The plant 110 may include a fleet area (not shown) and a loading area (not shown). The plant 110 may be a concrete plant (not shown), an asphalt plant (not shown) or other suitable plant. The mixer 120 may be located in the loading area (not shown) of the plant 110. The mixer 120 may have a bottom portion 120A. The discharge point 130 may be placed to direct material that runs there through the bottom portion 120A of the mixer 120. The one or more trucks 140 may receive material from the discharge point 130 that is placed to direct material that runs there through the bottom portion 120A of the mixer 120 into each of the one or more trucks 140. The one or more trucks 140 may leave the plant 110 and distribute material to an outside destination. The one or more trucks 140 may start in the fleet area (not shown) and are directed to the loading area (not shown), when the loading area (not shown) is empty along a loading path (not shown) within the plant 110. The output ID 150 may be affixed to each of the one or more trucks 140. The output ID reader 160 may read the output ID 150 with an identifier technology selected from the group consisting of a radio frequency or RF transmitter signal, a radio frequency or RF transponder signal, a quick response or QR code, a barcode, a camera, a global positioning satellite or GPS signal or an electronic tracking device signal. A call is then made to begin the discharge process. The material load verification non-transitory storage media 170 may be in communication with the output ID reader 160. The material load verification non-transitory storage media 170 resides on a database 172, the database 172 having a plurality of truck identifiers and a plurality of output ID reader identifiers residing on the database 172. The material load verification non-transitory storage media 170 may look for the output ID reader identifiers residing on the database 172. The database 172 may be in communication with a load matrix interface 174. The load matrix interface 174 may contain data entry fields that include date, time, customer name, mix design identification, quantity, slump, truck identification or ID number, output ID identification number, driver identification or ID number, driver name, comments, mix constituents and ticket number. The load matrix interface 174 compares the data entry fields on the load matrix interface 174 with the truck identifiers residing on the database 172. If the truck identifiers match the data entry fields, the discharge process continues and a batch weight prints with a success flag. If the truck identifiers don't match the data entry fields, an error message is displayed, a batch weight prints with an error flag and the discharge process is stopped. Another opportunity is then given to start the discharge process over and to load the right truck.

The material load verification non-transitory storage media having instructions stored thereon which, when executed, may execute a method comprising the steps of capturing the output identifier's ID back to the truck files stored in the server database, searching the truck files for the matching output ID, finding the corresponding truck number for the matching truck file and comparing the corresponding truck number to the truck number populated in the load matrix webpage for the current batch.

The capturing step may include the output identifier's ID is referenced back to the truck files stored in the server database after being captured. The searching step may include the matching output ID to the database a vendor chooses to point to. The finding step may include if the truck numbers do not match, then the discharge sequence is automatically held by the material load verification non-transitory storage media. The comparing step may include if the truck numbers do match, the discharge sequence initiates or continues normally.

Figure 2:
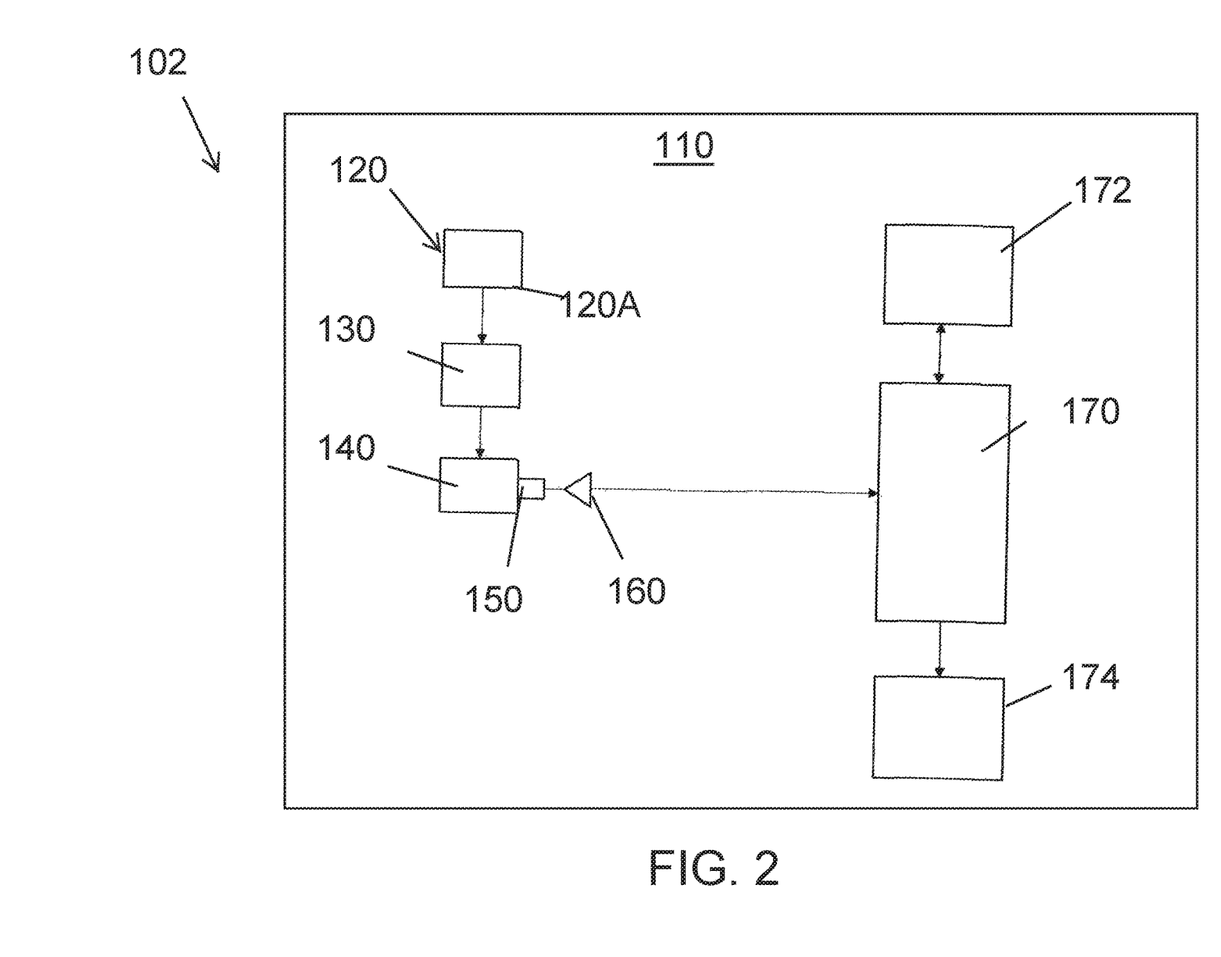
FIG. 2 illustrates a second system for verifying a load placed in one or more trucks, in accordance with one embodiment of the present invention.

FIG. 2 illustrates a second system 102 for verifying a load placed in one or more trucks 140, in accordance with one embodiment of the present invention.

The second system 102 may include a plant 110, a mixer 120, a discharge point 130, the one or more trucks 140, an output ID 150, an output ID reader 160 and a material load verification non-transitory storage media 170.

The plant 110 may include a fleet area (not shown) and a loading area (not shown). The plant 110 may be a concrete plant (not shown), an asphalt plant (not shown) or other suitable plant. The mixer 120 may be located in the loading area (not shown) of the plant 110. The mixer 120 may have a bottom portion 120A. The discharge point 130 may be placed to direct material that runs there through the bottom portion 120A of the mixer 120. The one or more trucks 140 may receive material from the discharge point 130 that is placed to direct material that runs there through the bottom portion 120A of the mixer 120 into each of the one or more trucks 140. The one or more trucks 140 may leave the plant 110 and distribute material to an outside destination. The one or more trucks 140 may start in the fleet area (not shown) and are directed to the loading area (not shown), when the loading area (not shown) is empty along a loading path (not shown) within the plant 110. The output ID 150 may be affixed to each of the one or more trucks 140. The output ID reader 160 may read the output ID 150 with an identifier technology selected from the group consisting of a radio frequency or RF transmitter signal, a radio frequency or RF transponder signal, a quick response or QR code, a barcode, a camera, a global positioning satellite or GPS signal or another electronic tracking device signal. A call is then made to begin the discharge process. The material load verification non-transitory storage media 170 may be in communication with the output ID reader 160. The material load verification non-transitory storage media 170 resides on a database 172, the database 172 having a plurality of truck identifiers and a plurality of output ID reader identifiers residing on the database 172.

The material load verification non-transitory storage media 170 may be in communication with a load matrix interface 174 to receive one of the output ID reader identifiers. The load matrix interface 174 may contain data entry fields that include date, time, customer name, mix design identification, quantity, slump, truck ID number, output ID number, driver ID number, driver name, comments, mix constituents and ticket number. The load matrix interface 174 compares the data entry fields on the load matrix interface 174 with the output device reader identifiers from the output device reader 160. If the output device reader identifiers match the data entry fields, the discharge process continues and a batch weight prints with a success flag. If the output device reader identifiers don't match the data entry fields, a batch weight prints with an error flag and the discharge process is stopped. Another opportunity is then given to start the discharge process over and to stage the right truck.

The material load verification non-transitory storage media having instructions stored thereon which, when executed, may execute a method comprising the steps that may communicate with the load matrix interface to produce an output ID match where if yes, a batch weight will print a success flag and the discharge sequence will proceed. If no, the output ID match will produce a hold error flag and the discharge sequence will not proceed.

Figure 3:
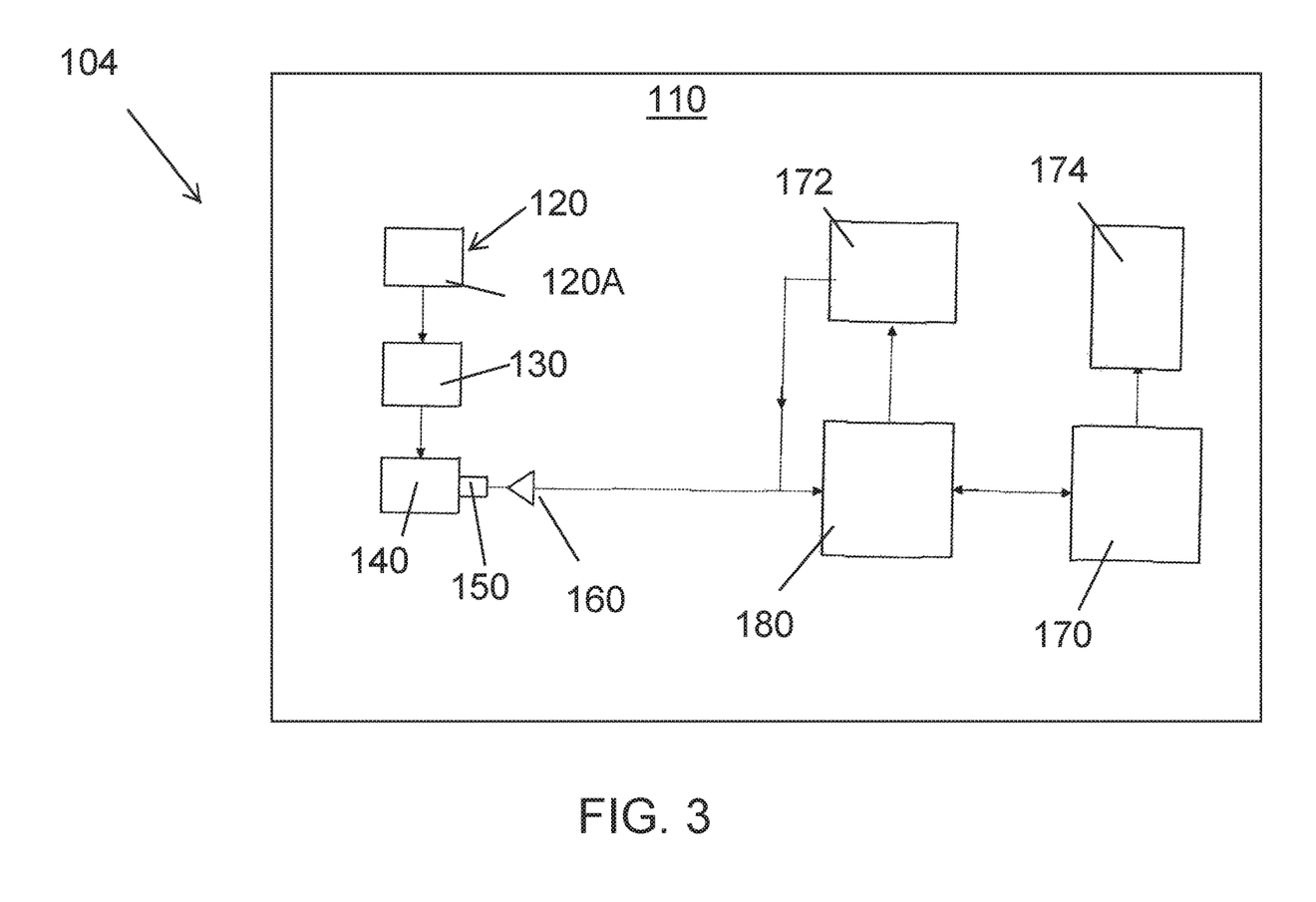
FIG. 3 illustrates a third system for verifying a load placed in one or more trucks, in accordance with one embodiment of the present invention.

FIG. 3 illustrates a third system 104 for verifying a load placed in one or more trucks 140, in accordance with one embodiment of the present invention.

The third system 104 may include a plant 110, a mixer 120, a discharge point 130, the one or more trucks 140, an output ID 150, an output ID reader 160, a material load verification non-transitory storage media 170 and a third-party cloud platform 180.

The plant 110 may include a fleet area (not shown) and a loading area (not shown). The plant 110 may be a concrete plant (not shown), an asphalt plant (not shown) or other suitable plant. The mixer 120 may be located in the loading area (not shown) of the plant 110. The mixer 120 may have a bottom portion 120A. The discharge point 130 may be placed to direct material that runs there through the bottom portion 120A of the mixer 120. The one or more trucks 140 may receive material from the discharge point 130 that is placed to direct material that runs there through the bottom portion 120A of the mixer 120 into each of the one or more trucks 140. The one or more trucks 140 may leave the plant 110 and distribute material to an outside destination. The one or more trucks 140 may start in the fleet area (not shown) and are directed to the loading area (not shown), when the loading area (not shown) is empty along a loading path (not shown) within the plant 110. The output ID 150 may be affixed to each of the one or more trucks 140. The output ID reader 160 may read the output ID 150 with an identifier technology selected from the group consisting of a radio frequency or RF transmitter signal, a radio frequency or RF transponder signal, a quick response or QR code, a barcode, a camera, a global positioning satellite or GPS signal or another electronic tracking device signal. A call is then made to begin the discharge process. The material load verification non-transitory storage media 170 may be a batch panel computer software or another similar device to which a fleet's truck numbers and its corresponding output IDs may be stored, outside of the material load verification non-transitory storage media 170. The material load verification non-transitory storage media 170 resides on a database 172, the database 172 having a plurality of truck identifiers and a plurality of output ID reader identifiers residing on the database 172. The material load verification non-transitory storage media 170 may be in communication with a load matrix interface 174 to receive one of the output ID reader identifiers. The load matrix interface 174 may contain data entry fields that include date, time, customer name, mix design identification, quantity, slump, truck ID number, output ID number, driver ID number, driver name, comments, mix constituents and ticket number. The load matrix interface 174 compares the data entry fields on the load matrix interface 174 with the output ID reader identifiers from the output ID reader 160. The third-party cloud platform 180 may be in communication with the output ID reader 160, to which data may be stored in a separate hardware instance, such as a host server system (not shown). If the output ID reader identifiers match the data entry fields, the discharge process continues and a batch weight prints with a success flag. If the output ID reader identifiers don't match the data entry fields, a batch weight prints with an error flag and the discharge process is stopped. Another opportunity is then given to start the discharge process over and to stage the right truck.

The material load verification non-transitory storage media having instructions stored thereon which, when executed, may execute a method comprising the steps that may include reading the load matrix's truck number, looking-up a truck number in a truck database contained in a third party material load verification non-transitory storage media and comparing the truck number that was read at the discharge point at the time of the discharge sequence being initiated.

The reading step may include the load matrix's truck number is read from the material load verification non-transitory storage media. The looking-up step may include wherein the truck output ID is compared. The comparing step may include the truck numbers do not match, then the discharge sequence is automatically stopped by the material load verification non-transitory storage media, otherwise, if they do match, the discharge sequence commences normally. The comparing step may include wherein the truck output IDs do not match, then the discharge sequence is automatically held by the material load verification non-transitory storage media, otherwise if they do match the discharge sequence commences normally.

Figure 4:
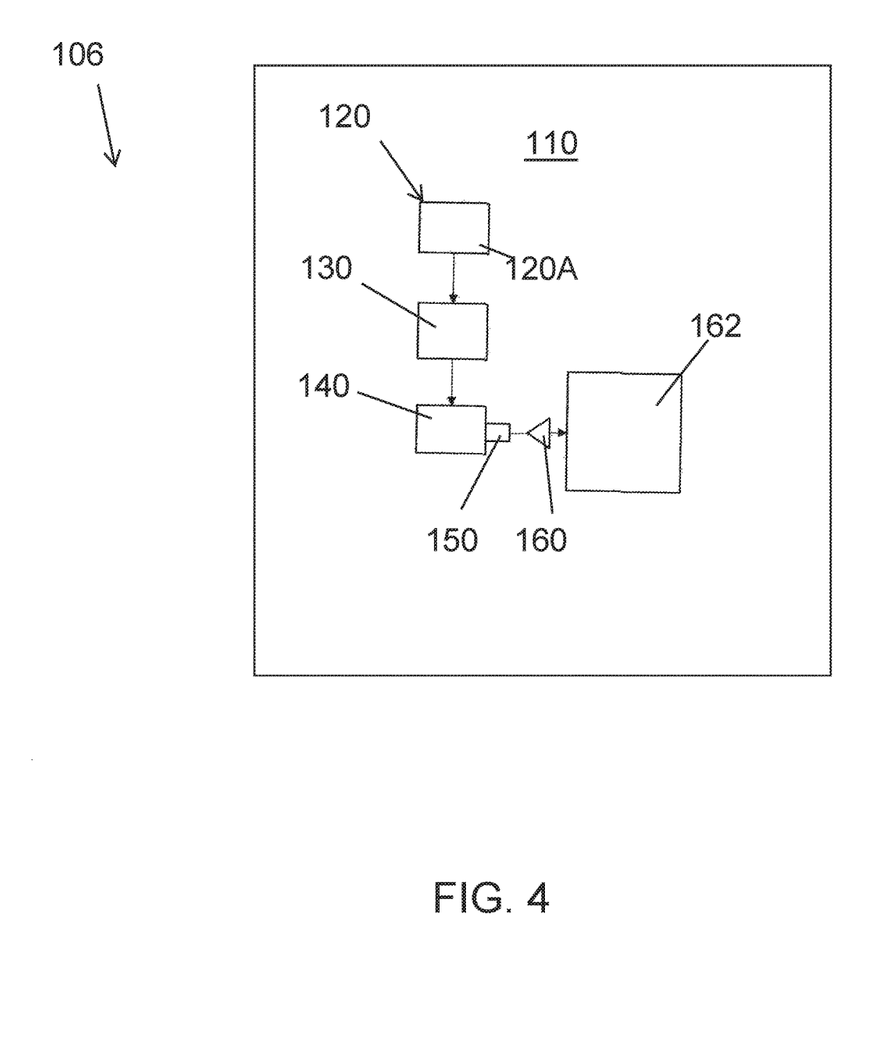
FIG. 4 illustrates a fourth system for verifying a load placed in one or more trucks, in accordance with one embodiment of the present invention.

FIG. 4 illustrates a fourth system 106 for verifying a load placed in one or more trucks, in accordance with one embodiment of the present invention.

The fourth system 106 may include a plant 110, a mixer 120, a discharge point 130, the one or more trucks 140, an output ID 150, an output ID reader 160 and a plant manager (not shown).

The plant 110 may include a fleet area (not shown) and a loading area (not shown). The plant 110 may be a concrete plant (not shown), an asphalt plant (not shown) or other suitable plant. The mixer 120 may be located in the loading area (not shown) of the plant 110. The mixer 120 may have a bottom portion 120A. The discharge point 130 may be placed to direct material that runs there through the bottom portion 120A of the mixer 120. The one or more trucks 140 may receive material from the discharge point 130 that is placed to direct material that runs there through the bottom portion 120A of the mixer 120 into each of the one or more trucks 140. The one or more trucks 140 may leave the plant 110 and distribute material to an outside destination. The one or more trucks 140 may start in the fleet area (not shown) and are directed to the loading area (not shown), when the loading area (not shown) is empty along a loading path (not shown) within the plant 110. The output ID 150 may be affixed to each of the one or more trucks 140. The output ID reader 160 may read the output ID 150 with an identifier technology selected from the group consisting of a radio frequency or RF transmitter signal, a radio frequency or RF transponder signal, a quick response or QR code, a barcode, a camera, a global positioning satellite or GPS signal or another electronic tracking device signal. A call is then made to begin the discharge process. An output ID reader 162 may display data from the output ID reader 160 and may include a computer monitor (not shown) or another suitable output ID. The output ID may be read, relayed and a configuration decision would be made by a plant manager or other suitable based on comparing a truck file database with the load matrix interface.

A test step is then made to determine if there is a match when comparing the truck file database with the load matrix interface. If yes, then there is an option for positive audio and visual feedback and an option for a still image or video with a timestamp. The discharge sequence is then allowed to initiate or continue and the plant manager may put a manual hold. If a manual hold is put on, the discharge sequence is restarted or if the discharge sequence is aborted, the load sequence is ended, an error flag is printed on a batch weigh option and an optional image or video is taken with a timestamp. If no, the load sequence is ended, an optional image or video is taken with a timestamp, a success flag is printed on the batch weight option and all records are stored.

If there is not a match when comparing the truck file database with the load matrix interface, there is an option for negative audio or visual feedback and an option for still image or video taken with a timestamp. The discharge sequence is then not allowed to initiate or continue and a plant operator is flagged with a plurality of options. These options include continuing, manually updating the truck ID, retry or abort. If continued, the discharge sequence is allowed to initiate or continue and the plant manager may put a manual hold. If yes, the discharge sequence is restarted. If no, the load sequence is ended ad an optional video or still image is taken with a timestamp, an error flag is printed on batch weight option and all records are stored.

The key functionality of the system is that output IDs are compared through a material load verification non-transitory storage media and that the same material load verification non-transitory storage media may interact with the material load verification non-transitory storage media to the extent of controlling discharge sequence initiation, subsequently holding or continuing the discharge sequence. Other functionality would include the option or ability to print on the batch weights to whether a load was successfully or not successfully verified prior to loading. Also included would be an option to store electronically all records for future reconciliation or audit. Other functionality would include the option to provide and control audio or visual feedback to trucks at the discharge point of the plant. Other functionality would include the option to at the moment of verification to take a digital still image or video that would be electronically timestamped and directly referenced to the current batch for a particular truck for future reference.

If a discharge sequence is held by the material load verification non-transitory storage media due to truck output IDs not matching, the plant operator would be flagged with an error message, giving the plant operator the opportunity to remove the incorrect truck from the discharge point and move the proper truck into place at the discharge point or prior to the discharge sequence being initiated but prior to any batch constituents being discharged into the truck, essentially saving the load from being discharged into the incorrect truck.

General industry language and descriptions apply to the following. Descriptions may vary, but conceptually the ideas are understood throughout the industry.

(A) Object or Truck: A physical asset such as a truck, capable of hauling or transporting a batched load of materials, such as material, asphalt, or other earth born materials.

(B) Batch or Load: The actual combination of mix constituents that is to be discharged into an object at the loading point of a ready mix plant or asphalt plant.

(C) Discharge point: The point where mix constituents are introduced into an object at a ready mix plant or asphalt plant. This is also a physical location at a ready mix material or asphalt plant to where the object is parked prior to receiving the batch. Commonly known as the boot or sock.

(D) Load matrix: A point in the batch non-transitory storage media to where the truck ID, mix number, quantity, slump, and other constituents may be entered prior to the batch weigh sequence being initiated. The load matrix contains all necessary information to batch an individual load of material or asphalt.

(E) Batching non-transitory storage media: The system that contains all of the necessary hardware and non-transitory storage media being directly responsible for weighing out mix constituents for a batch of material or asphalt and controlling all automated processes involved with loading a truck at a discharge point.

(F) Dispatch non-transitory storage media: The system that contains all of the necessary hardware and non-transitory storage media for order entry, scheduling, and ticketing. Commonly interfaced directly to batching non-transitory storage media.

(G) Output identifier: A combination of characters or identifiers contained within an output ID for the purpose of identifying an object.

(H) Fleet: All of the physical objects that a particular business entity holds, or, chooses to identify, in the case that brokers are hired. Each object in a fleet, however defined, would have a unique truck ID and unique output ID entered into the dispatch/batch non-transitory storage media database that could exist on a third party platform or anywhere.

(I) Discharge sequence: The batching process to where all weighed mixed constituents from the batch weigh sequence are to be discharged into a truck at a discharge point.

(J) Batch Weights: A physical or electronic record of all batch constituents of a given truck after all mixed constituents have been weighed or metered and discharged into a truck. This record is highly regarded by contractor as the proof that the correct weights and measures were proper for a batch prior to delivery.

While the present invention has been related in terms of the foregoing embodiments, those skilled in the art will recognize that the present invention is not limited to the embodiments described. The present invention may be practiced with modification and alteration within the spirit and scope of the appended claims. Thus, the description is to be regarded as illustrative instead of restrictive on the present invention.

What is claimed is:

1. A system for verifying a load placed in one or more trucks, comprising:

a plant including a fleet area and a loading area;
a mixer located in the loading area of the plant, the mixer having a bottom portion;
a discharge point placed to direct material that runs there through the bottom portion of the mixer;
one or more trucks receiving material from the discharge point that is placed to direct material that runs there through the bottom portion of the mixer into each of the one or more trucks;
an identifier affixed to each of the one or more trucks;
an identifier reader for reading the output identifier;
a material load verification non-transitory storage media residing on a database, the database having a plurality of truck identifiers and a plurality of identifier reader data sets corresponding to each of the one or more trucks residing on the database, the material load verification non-transitory storage media look for the identifier reader data sets residing on the database, the database in communication with a load matrix interface and the load matrix interface compares the data entry fields on the load matrix interface with the truck identifiers residing on the database;
a third-party cloud platform in communication with the identifier reader; and
wherein if the identifier reader output matches the data sets, a discharge process continues and a batch weight prints with a success flag, and if the output ID identifier reader output does not match the data sets, a batch weight prints with an error flag and the discharge process is stopped.

2. The system according to claim 1, wherein the identifier reader a signal detector arranged to detect at least one of a RF transmitter signal, a RF transponder signal, a QR code, a barcode, a camera, a GPS signal or an electronic tracking device signal.

3. The system according to claim 1, wherein the load matrix interface contains data entry fields comprising date, time, customer name, mix design identification, quantity, slump, truck identification number, identifier number, driver identification number, driver name, comments, mix constituents and ticket number.

4. A method for verifying a load discharged into each of a plurality of trucks, comprising:
automatically identifying at least one truck approaching a load discharge point of a plant;
automatically determining whether the identified at least one truck corresponds to properties of a load of material proximate the load discharge point; and
when the identified at least one truck corresponds to the properties of the load of material, automatically discharging the load of material into the identified at least one truck and when the identified at least one truck does not correspond to the properties of the load of material, inhibiting discharge of the load of material and when the identified at least one truck does not correspond to the load of material printing a batch weight and an error flag.

5. The method of claim 4 wherein the automatically identifying comprises automatically detecting at least one of a RF transmitter signal, a RF transponder signal, a QR code, a barcode, a camera, a GPS signal and an electronic tracking device.

6. The method of claim 4 wherein the properties of the load of material are identified by data stored on non-transitory storage medium, the data comprising one or more of date, time, customer name, mix design identification, quantity, slump, truck identification number, output identification number, driver identification number, driver name, comments and mix constituents.

7. The method of claim 4 further comprising when the identified at least one truck corresponds to the load of material printing a batch weight and a success flag.

8. A system for verifying a load placed in one or more trucks, comprising:
a plant including a fleet area and a loading area;
a mixer located in the loading area of the plant, the mixer having a bottom portion;
a discharge point placed to direct material that runs there through the bottom portion of the mixer;
one or more trucks receiving material from the discharge point that is placed to direct material that runs there through the bottom portion of the mixer into each of the one or more trucks;
an identifier affixed to each of the one or more trucks;
an identifier reader reading the output identifier;
a material load verification non-transitory storage media residing on a database, the database having a plurality of truck identifiers and a plurality of identifier reader data sets corresponding to each of the one or more trucks residing on the database, the material load verification non-transitory storage media look for the identifier reader data sets residing on the database, the database in communication with a load matrix interface and the load matrix interface compares the data entry fields on the load matrix interface with the truck identifiers residing on the database;
a third-party cloud platform in communication with the identifier reader; and
wherein the load matrix interface contains data entry fields comprising date, time, customer name, mix design identification, quantity, slump, truck identification number, identifier number, driver identification number, driver name, comments, mix constituents and ticket number.

9. The system according to claim 8, wherein the identifier reader a signal detector arranged to detect at least one of a RF transmitter signal, a RF transponder signal, a QR code, a barcode, a camera, a GPS signal or an electronic tracking device signal.

10. The system of claim 8 wherein wherein if the identifier reader output matches the data sets, a discharge process continues and a batch weight prints with a success flag, and if the output ID identifier reader output does not match the data sets, a batch weight prints with an error flag and the discharge process is stopped.

* * * * *